US008694186B2

(12) United States Patent
Syed et al.

(10) Patent No.: US 8,694,186 B2
(45) Date of Patent: Apr. 8, 2014

(54) METHOD AND SYSTEM FOR ENGINE CONTROL (75) Inventors: Fazal Urrahman Syed, Canton, MI (US); Venkatapathi Raju Nallapa, Dearborn, MI (US); Mathew Alan Boesch, Plymouth, MI (US); Douglas Raymond Martin, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 13/192,166

(22) Filed: Jul. 27, 2011

(65) Prior Publication Data

US 2013/0030616 A1 Jan. 31, 2013

(51) Int. Cl.
*B60L 9/00* (2006.01)
*B60W 10/06* (2006.01)

(52) U.S. Cl.
USPC ............... 701/22; 180/65.28; 180/65.265

(58) Field of Classification Search
USPC ................... 701/22; 180/65.28; 903/930
See application file for complete search history.

(56) References Cited

U.S. PATENT DOCUMENTS

| 4,913,117 | A  | * | 4/1990  | Hashimoto et al. | 123/406.3 |
| 4,936,261 | A  | * | 6/1990  | Naumann et al. | 123/1 A |
| 5,686,398 | A  | * | 11/1997 | Minokami et al. | 508/481 |
| 5,806,490 | A  | * | 9/1998  | Nogi et al. | 123/435 |
| 6,269,290 | B1 | * | 7/2001  | Egami et al. | 701/22 |
| 6,332,448 | B1 | * | 12/2001 | Ilyama et al. | 123/304 |
| 6,474,308 | B2 | * | 11/2002 | Okumura et al. | 123/491 |
| 6,951,202 | B2 | * | 10/2005 | Oda | 123/406.29 |
| 7,004,147 | B2 | * | 2/2006  | Kang | 123/479 |
| 7,216,681 | B2 | * | 5/2007  | Valentine et al. | 141/349 |
| 7,273,040 | B2 | * | 9/2007  | Shouda et al. | 123/491 |
| 7,418,942 | B2 | * | 9/2008  | Niimi | 123/327 |
| 7,597,072 | B2 | * | 10/2009 | Stein et al. | 123/90.15 |
| 7,743,737 | B2 | * | 6/2010  | Valentine et al. | 123/1 A |
| 7,920,955 | B2 | * | 4/2011  | Bauer et al. | 701/103 |
| 8,042,518 | B2 | * | 10/2011 | Jankovic et al. | 123/429 |
| 8,061,383 | B2 | * | 11/2011 | Gouzou et al. | 137/572 |
| 8,090,520 | B2 | * | 1/2012  | Tate et al. | 701/104 |
| 8,290,684 | B2 | * | 10/2012 | Yuen et al. | 701/102 |
| 8,321,158 | B2 | * | 11/2012 | Proefke et al. | 702/50 |

(Continued)

FOREIGN PATENT DOCUMENTS

DE   10 2008 002 356 A1   12/2009

OTHER PUBLICATIONS

"Regulation of Fuels and Fuel Additives: Standards for Reformulated and Conventional Gasoline," Environmental Protection Agency, Feb. 16, 1994, 394 pages.

(Continued)

*Primary Examiner* — Thomas Black
*Assistant Examiner* — Tyler Paige
(74) *Attorney, Agent, or Firm* — Julia Voutyras; Alleman Hall McCoy Russell & Tuttle LLP (57) ABSTRACT

Methods and systems are provided for adjusting operation of a plug-in hybrid electric vehicle responsive to a seasonal grade of the fuel available in the vehicle's fuel tank. If the seasonal grade of fuel in the fuel tank does not correspond to the seasonal grade of fuel mandated during the time of engine operation, a fuel injection amount is adjusted to compensate for differences between seasonal grades of a fuel.

20 Claims, 4 Drawing Sheets

(56) References Cited

U.S. PATENT DOCUMENTS

| | | | |
|---|---|---|---|
| 2007/0292724 A1* | 12/2007 | Gilchrist | 429/9 |
| 2008/0167788 A1* | 7/2008 | Tate et al. | 701/104 |
| 2009/0321159 A1 | 12/2009 | Andri | |
| 2009/0321164 A1* | 12/2009 | Andri | 180/65.265 |
| 2010/0256931 A1 | 10/2010 | Proefke et al. | |
| 2010/0300551 A1* | 12/2010 | Yuen et al. | 137/3 |
| 2010/0300781 A1 | 12/2010 | Leone | |
| 2011/0066352 A1* | 3/2011 | Blanchard et al. | 701/102 |
| 2011/0257869 A1* | 10/2011 | Kumar et al. | 701/103 |

OTHER PUBLICATIONS

Silverman, Jacob, "Why is summer fuel more expensive than winter fuel?" How Stuff Works: "Summer-grade versus Winter-grade Fuel," Access date Oct. 25, 2011, 3 pages.

\* cited by examiner

FIG. 4

METHOD AND SYSTEM FOR ENGINE CONTROL

FIELD

The present application relates to adjusting an engine fuel injection in vehicles, such as hybrid vehicles, responsive to a fuel age.

BACKGROUND AND SUMMARY

Federal emissions regulations mandate the reformulation of fuels, such as gasoline fuel, sold at pumps to reduce the content of toxic and ozone-forming compounds in vehicle emissions. For example, to reduce the emission of volatile organic compounds (VOC), fuels sold in southern areas (e.g., areas categorized under ASTM class B) may be required to have a lower Reid vapor pressure (RVP) as compared to fuels sold in northern areas (e.g., areas categorized under ASTM class C) during summer months. Specifically, the differences in climate between the two types of areas may require a corresponding difference in the gasoline fuel volatility to achieve the same emissions effect.

Conventional gasoline engine vehicles and hybrid electric vehicles (HEVs) usually consume fuel in a relatively short period of time. Therefore, such vehicles are typically running on the correct fuel grade specific to that region for that season. However, with the advent of Plug-in HEVs (PHEVs) wherein a person may keep charging the vehicle and running the vehicle primarily in the electric mode, a vehicle may be running on the wrong fuel grade for that season. For example, during a summer season, a PHEV may have a winter-grade fuel in the fuel tank due to frequent charging and reduced usage of gasoline over the winter months. Likewise, during a winter season, the PHEV may have a summer-grade fuel in the fuel tank during winter due to frequent charging and reduced usage of gasoline over the summer months. Due to differences, such as volatility difference, between the summer and winter-grade fuels, the winter-grade fuel when used in summer may negatively impact vehicle emissions, while the summer-grade fuel when used in winter may degrade engine cold-starts. Overall, vehicle performance and emissions are degraded.

Thus, in one example, some of the above issues may be at least partly addressed by a method of operating a vehicle including an engine and a motor comprising, adjusting an engine fuel injection amount based on a seasonal grade of fuel in a fuel tank of the vehicle relative to a season of vehicle operation. In this way, if the seasonal grade of the fuel available in the fuel tank does not correspond to the fuel grade mandated during the current season of vehicle operation, a fuel injection correction may be applied to compensate for differences in seasonal fuel grade.

In one example, prior to operation of a PHEV in the engine mode, a fuel age may be determined by the engine controller. The fuel age may be determined based on one or more of a distance traveled since the last refueling, an amount of fuel consumed since the last refueling, a fuel tank level, and season information from a real time clock or auxiliary system (e.g., navigation system) of the electric vehicle. Based on the age of the fuel and the current date, or season during which the vehicle is being operated, a seasonal grade of the fuel can be inferred (e.g., it may be determined whether the fuel is summer-grade or winter-grade fuel). Accordingly, an amount of fuel to be injected into the engine may be adjusted using a fuel correction factor that may compensate for differences in volatile compound composition and resultant fuel volatility of the fuel stored in the fuel tank relative to the fuel mandated at the current time of year, or season. In addition to the fuel injection amount, one or more other engine operating parameters may be adjusted using the fuel correction factor, such as engine boost, valve timing, throttle adjustments, etc.

In this way, by compensating for differences between the fuel currently available in the tank relative to the fuel currently sold (and mandated), exhaust emissions from the use of a winter-grade fuel during summer seasons may be brought closer to the exhaust emissions from the use of a summer-grade fuel. Additionally, engine cold starts during winter months using summer-grade fuel may be improved. As such, vehicle performance and emissions may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
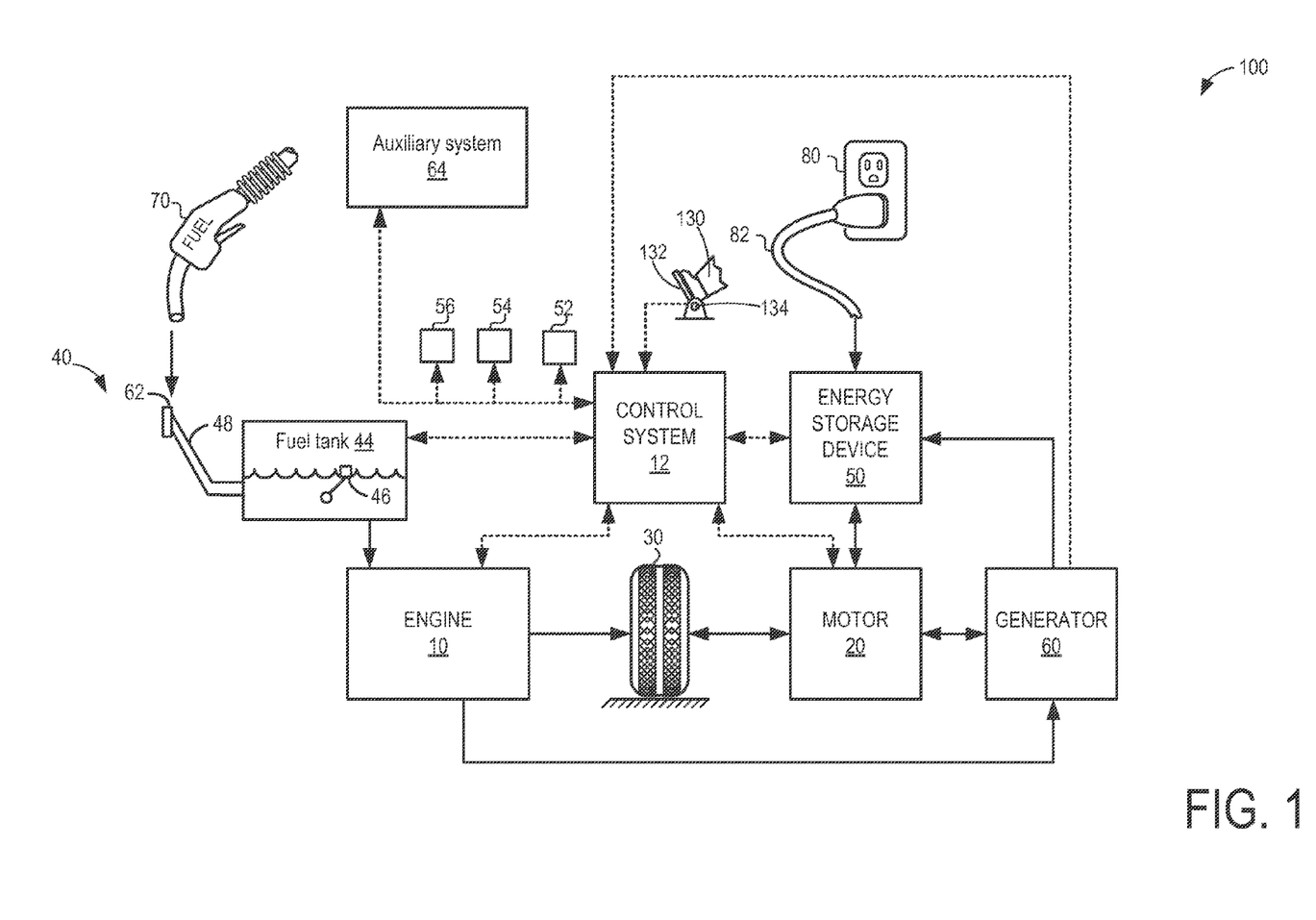
FIG. 1 illustrates an example vehicle system.
Figure 3:
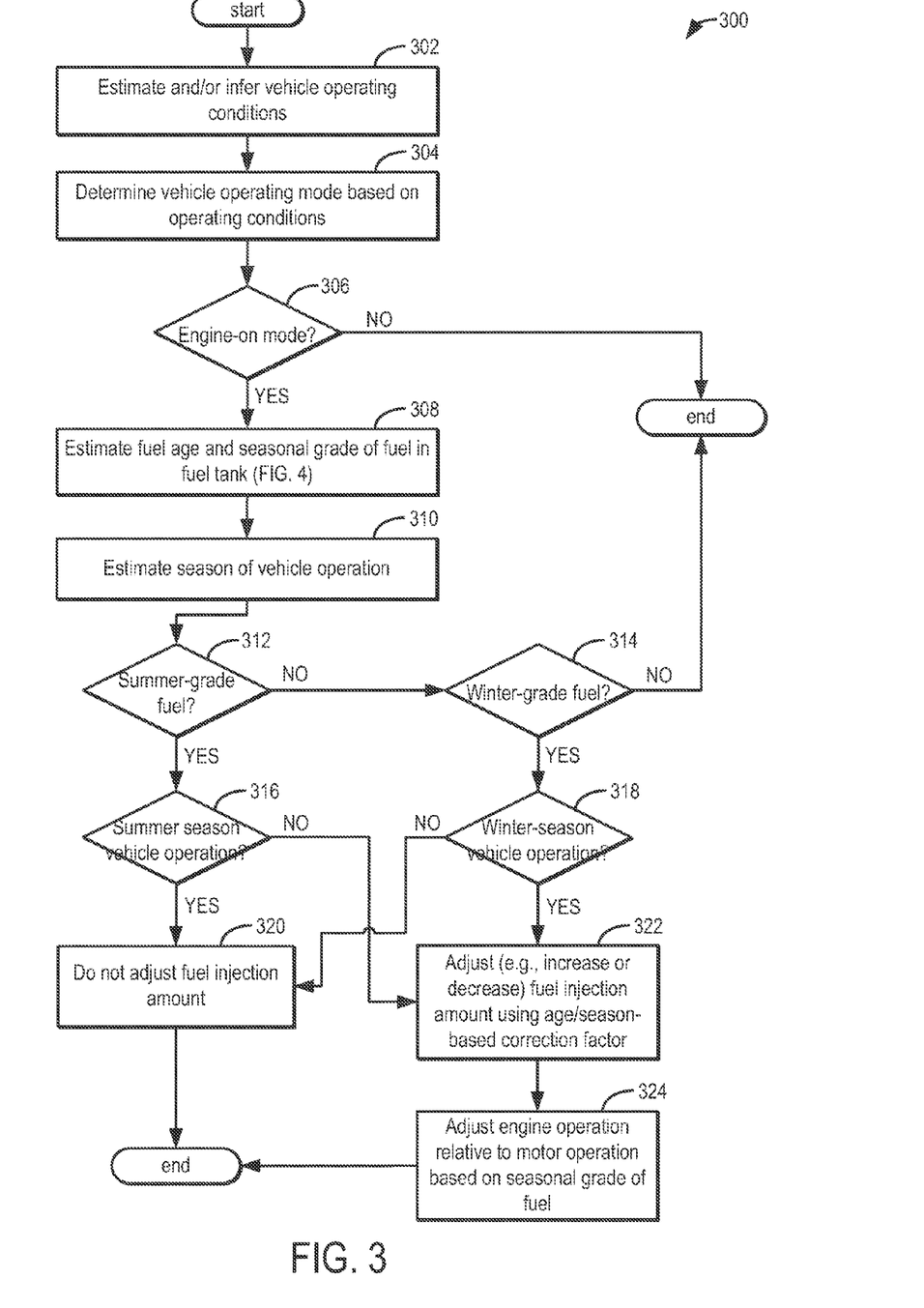
FIG. 3 illustrates a high level flow chart illustrating a routine for adjusting engine operations based on a fuel age.
Figure 4:
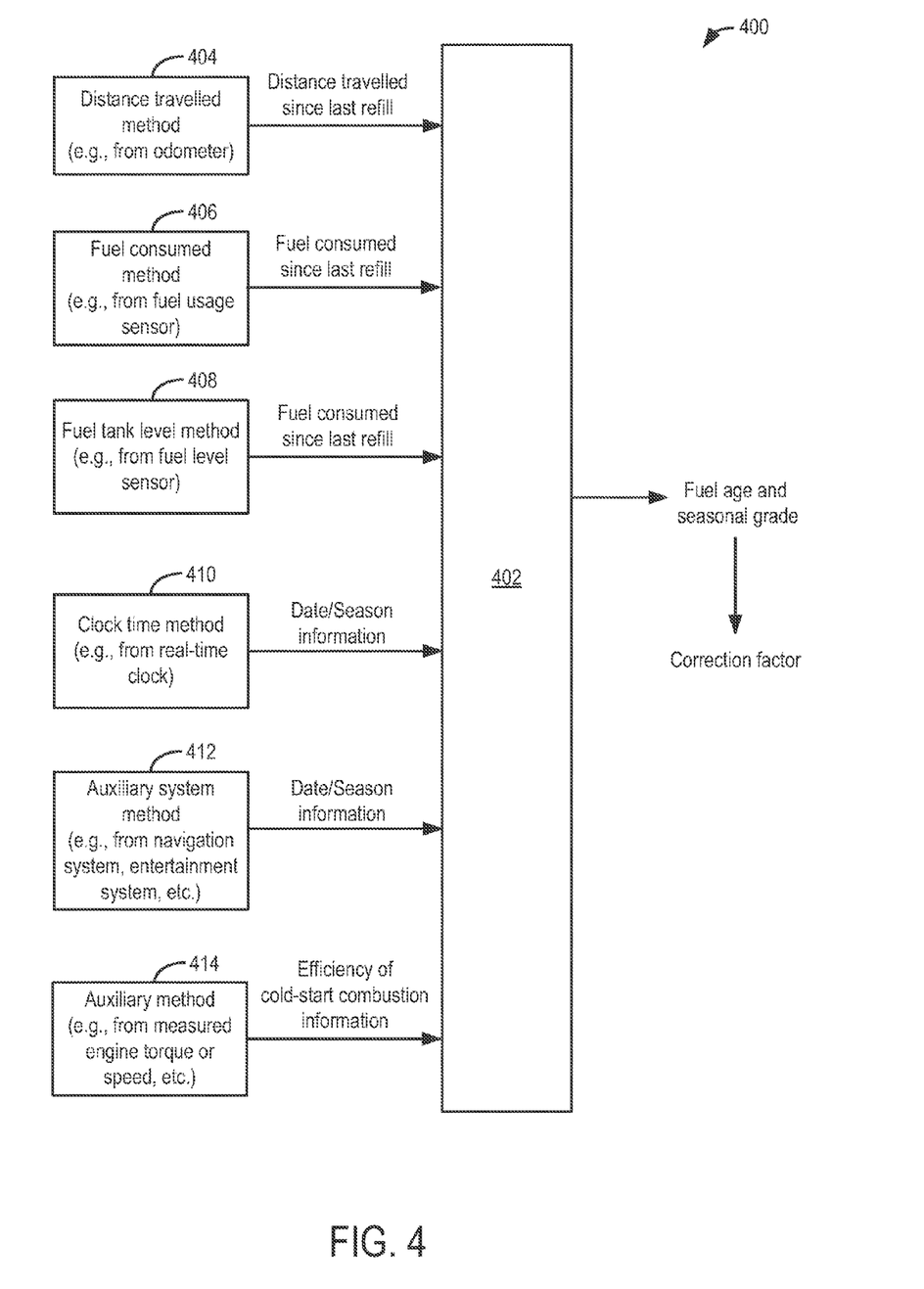
FIG. 4 illustrates example methods for determining the fuel age and/or seasonal grade of fuel stored in the vehicle system of FIG. 1.

The following description relates to systems and methods for operating a hybrid electric vehicle, such as the plug-in hybrid electric vehicle of FIG. 1. Based on the age and seasonal grade of a fuel available in the fuel tank, relative to a season/date of vehicle operation, engine operation may be adjusted. Specifically, during an engine-on mode of operation of the vehicle, a controller may be configured to perform a routine, such as shown in FIGS. 3-4, to estimate a fuel age and seasonal grade. If the seasonal grade of the fuel does not correspond to the season of vehicle operation, a fuel injection amount may be adjusted using a correction factor to compensate for season-based fuel composition and emission differences. In this way, a summer-grade fuel may be used in winter and a winter-grade fuel may be used in summer without degrading vehicle emissions or engine performance.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

Fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

As such, based on the fuel composition, the fuel stored in fuel tank 44, and used in the engine 10, may have varying volatility. A number of fuel parameters, including fuel volatility, impact vehicle emissions. Other fuel parameters and fuel additives that affect vehicle emissions include the Reid vapor pressure (RVP) of the fuel, fuel oxygen, benzene and aromatics content, as well as the presence of sulfur, T90 (or E300), olefins, and T50 (or E200). To control the emissions of volatile organic compounds (VOC), fuel RVP and oxygen specifications have been mandated by the EPA. For example, fuels sold during high ozone (or summer) seasons (that is, from June 1 through September 15), are required to have an RVP of no more than 7.2 psi in southern areas (that is, VOC control region 1, or ASTM class B during summer) and 8.1 psi in northern areas (that is, VOC control region 2, or ASTM class C during summer). The difference in climate between the two areas requires a corresponding difference in fuel (e.g., gasoline) volatility to achieve the same emissions effect. As such, the high ozone season is selected to be June 1-September 15 by the EPA as most ozone violations occur during this period. Since fuels with higher RVP evaporate more easily than fuels with lower RVP, by mandating a fuel with a lower RVP during summer seasons, the VOC emissions of the summer-grade fuel can be improved, and ozone violations can be reduced.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

As described herein, engine 10 may be periodically set to a deactivated state (or engine-off mode) where the consumption of fuel at the engine is significantly reduced or discontinued. When engine 10 is deactivated for extended periods of time, the fuel stored at fuel tank 44 may take a longer time to be depleted by the engine. Consequently, longer durations may elapse between fuel tank refilling events. For example, fuel tank 44 may be refilled during a winter season with a winter-grade fuel, but due to frequent charging and reduced fuel usage over the winter months, the winter-grade fuel may be available in the fuel tank even in summer Likewise, the fuel tank may be refilled during a summer season with a summer-grade fuel, but due to frequent charging and reduced fuel usage over the summer months, the summer-grade fuel may be available in the fuel tank even in winter. Due to the above-discussed volatility differences between summer-grade and winter-grade fuels, a winter-grade fuel when used in summer may degrade vehicle emissions by increasing the release of ozone-forming VOCs. The same volatility differences may also cause a summer-grade fuel that is used in winter to degrade engine cold-starts.

As elaborated herein with reference to FIGS. 3-4, the control system may be configured to determine an age of the fuel available in the fuel tank prior to engine operation. The fuel age may be estimated based on a fuel level (as determined by the fuel level sensor 46), a total distance traveled since the last fueling (e.g., as indicated on an odometer 54), and/or a total fuel consumed since the last fueling (e.g., as indicated by a fuel usage sensor). In still other embodiments, the fuel age may be estimated based on season information from a real-time clock 56 coupled to control system 12. Clock 56 may be configured to provide a real-time estimate of time and accordingly provide seasonal information (e.g., whether in summer season or winter season). Further still, the age may be estimated based on seasonal information from an auxiliary system 64 of the vehicle. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the control system 12 of the vehicle and a global positioning satellite via wireless communication.

In one example, fuel gauge 52, odometer 54, clock 56, and auxiliary system 64 may be coupled to a message center (not shown) on the vehicle's dashboard. The message center may include indicator light(s) and/or a text-based display in which messages are displayed to an operator, such as a message requesting an operator input to refill the fuel tank or start the engine.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
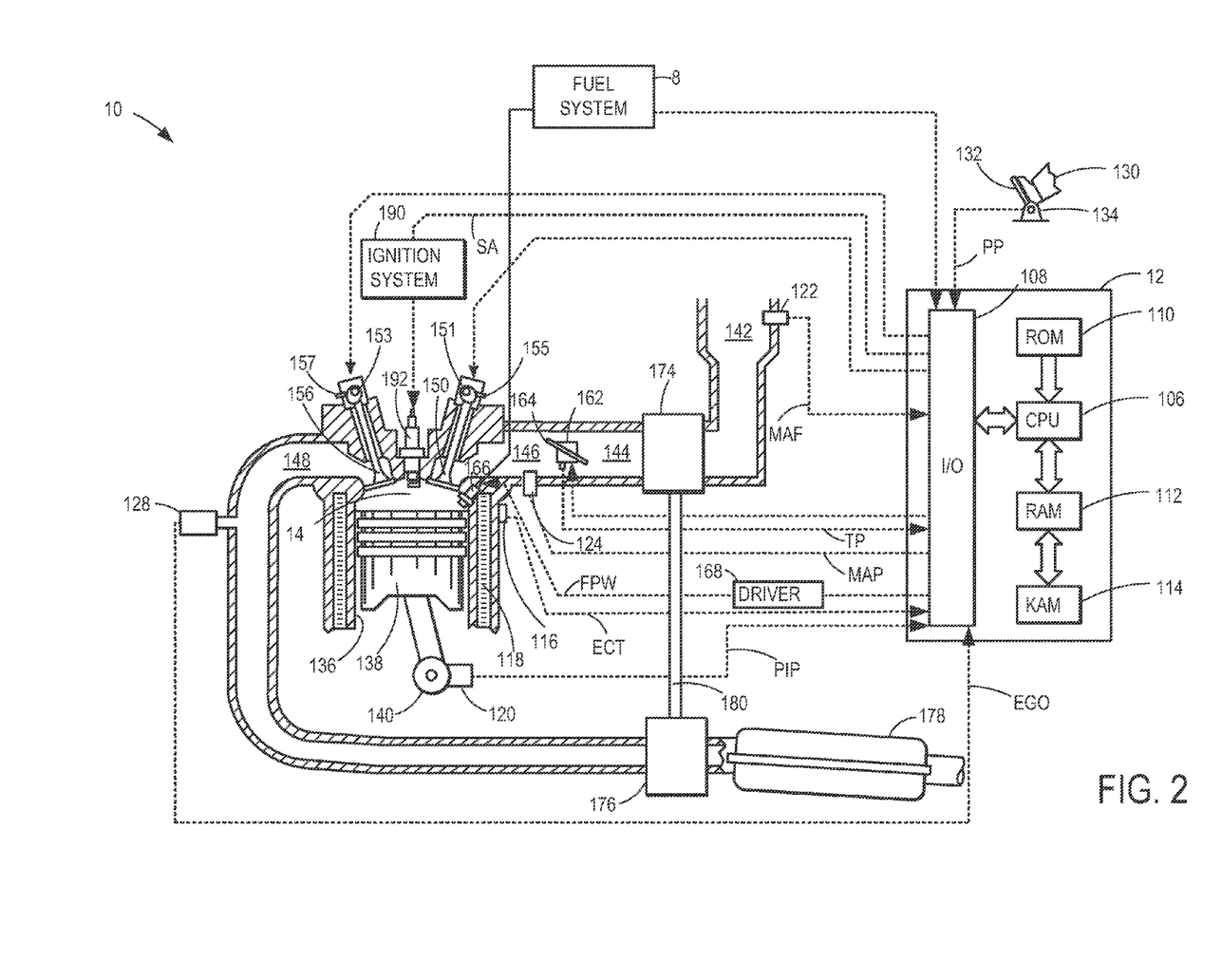
FIG. 2 illustrates an example internal combustion engine.

As elaborated in FIG. 2, controller 12 may receive input data from various sensors, process the input data, and trigger various actuators in response to the processed input data based on instruction or code programmed therein corresponding to one or more routines. Example control routines are described herein with regard to FIGS. 3-4.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/exhaust valves and cams, etc. The controller may receive input data from the various sensors, process the input data, and trigger the actuators in response to the processed input data based on instruction or code programmed therein corresponding to one or more routines. Example control routines are described herein with regard to FIGS. 3-4.

Now turning to FIG. 3, an example routine 300 is shown for adjusting the engine operation of a plug-in hybrid electric vehicle, including a fuel injection amount, based on an age and seasonal grade of fuel available in the fuel tank of the vehicle relative to a date/season of vehicle operation. By compensating for differences between the seasonal grade of fuel available and the seasonal grade of fuel mandated during the time (or season) of vehicle operation, vehicle emissions and performance can be improved.

At 302, vehicle operating conditions may be estimated and/or inferred. For example, the control system may receive sensor feedback from one or more sensors associated with the vehicle propulsion system components, as described above. Operating conditions estimated may include, for example, an indication of vehicle operator requested output (or torque), a fuel level or fuel amount at the fuel tank, engine fuel usage rate, state of charge (SOC) of the on-board energy storage device, ambient conditions including humidity, temperature, engine coolant temperature, climate control request (e.g., air-conditioning or heating requests), etc.

Based on the estimated vehicle operating conditions, at 304, a vehicle operating mode may be determined. Specifically, the control system may determine whether to operate the vehicle in an engine-off mode (wherein the vehicle is propelled using energy from operation of the electric motor), or in an engine-on mode (wherein the vehicle is either propelled using energy only from operation of the engine, or from energy from operation of both the engine and the motor). As one example, if the state of charge (SOC) of the on-board energy storage device is lower than a threshold SOC, the control system may operate only the engine to propel the vehicle. In another example, if the state of charge (SOC) of the on-board energy storage device is higher than the threshold SOC, the control system may operate only the motor to propel the vehicle. In still another example, when the operator requested torque is greater than a first, lower threshold but lower than a second, higher threshold, the control system may operate only the engine to propel the vehicle, while if the operator requested torque is smaller than the first, lower threshold, the control system may operate only the motor to propel the vehicle. In comparison, if the operator requested torque is greater than the second, higher threshold, the control system may operate both the engine and the motor to propel the vehicle. In still other embodiments, the control system may utilize a combination of the above parameters, as well as other vehicle operating parameters (e.g., cooling/heating requests), when judging the vehicle operating mode at 304.

At 306, an engine-on mode may be confirmed. That is, it may be confirmed that a fuel is to be injected and combusted in the engine to propel the vehicle. As such, if the vehicle is being operated in an engine-off mode, the routine may end. At 308, a fuel age and seasonal grade of the fuel available in the fuel tank may be estimated and/or inferred. As elaborated herein with reference to FIG. 4, the fuel age and/or seasonal information may be estimated based on one or more of a fuel level in the fuel tank coupled to the engine, a distance traveled since a most recent fuel tank refill event, an amount of fuel consumed since the most recent fuel tank refill event, a clock-time and/or season information from a clock (or clock setting) included in the vehicle (or included in an auxiliary system of the vehicle, such as a navigation system). In one example, the seasonal grade of the fuel may be inferred based on the estimated age of the fuel. For example, based on the age of the fuel, it may be determined whether the available fuel is a summer-grade fuel or a winter-grade fuel. In still other examples, such as when the fuel in the fuel tank comes from an unknown or dubious source, the effective seasonal grade of the fuel may be estimated based on the measured efficiency of cold-start combustion of the fuel.

At 310, a season of vehicle operation may be estimated based on, for example, a clock, a clock setting, or calendar setting of the vehicle. In one example, the vehicle may include a real-time clock configured to display a real-time clock time (e.g., on a vehicle dashboard or message center visible to the vehicle operator) and/or a calendar date. Based on the real-time clock time, or calendar setting, a current date or season of vehicle operation may be determined. In another example, the vehicle may include an auxiliary system having a clock setting, such as a clock setting of a navigation system (e.g., on-board GPS) or an entertainment system (e.g., radio, stereo system, etc.). The auxiliary system may also have a calendar setting. Based on the clock setting (and/or calendar setting) of the vehicle auxiliary system, a current date or season of vehicle operation may be determined.

At 312, it may be determined whether the fuel in the fuel tank is a summer-grade fuel. If the fuel is determined to be a summer-grade fuel (at 312), then at 316, it may be determined if the vehicle is being operated during a summer season. In one example, the summer season may include a time between June and September, however, in alternate examples, the summer season may be defined by the geographical location of the vehicle (e.g., northern hemisphere, southern hemisphere, geographical latitude, etc.). For example, the vehicle's auxiliary system may include a location setting for determining the geographical location (e.g., latitude) of the vehicle and the control system may be configured to define "summer season" and/or "winter season", for purposes of fuel age estimation, based on the determined geographical location.

If the fuel is a summer-grade fuel and the vehicle is operated during a summer season, then at 320, the engine may be operated without adjusting the fuel injection amount to compensate for seasonal fuel-grade differences. That is, an engine fuel injection amount may be determined by the controller based on engine and vehicle operating conditions only, and without adjusting the fuel injection amount with a seasonal fuel-grade based correction factor. If a summer-grade fuel is not confirmed at 312, then at 314, it may be determined whether the fuel in the fuel tank is a winter-grade fuel. If the fuel determined to be a winter-grade fuel (at 314), then at 318, it may be determined if the vehicle is being operated during a winter season. If the fuel is a winter-grade fuel and the vehicle is operated during a winter season, as with the use of a summer-grade fuel during a summer season, at 320, the engine may be operated without adjusting the fuel injection amount to compensate for seasonal fuel-grade differences. That is, an engine fuel injection amount may be determined by the controller based on engine and vehicle operating conditions only, and without adjusting the fuel injection amount with a seasonal fuel-grade based correction factor.

In comparison, if the fuel is a summer-grade fuel and the vehicle is operated during a winter season, or if the fuel is a winter-grade fuel and the vehicle is operated during a summer season, then at 322, the engine fuel injection amount may be adjusted to compensate for seasonal fuel-grade differences. As such, the adjustment may vary based on whether a summer-grade fuel is being used in a winter season or if a winter-grade fuel is being used in a summer season. This may be at least due to volatility differences between seasonal grade fuels that can cause a winter-grade fuel used in summer to degrade vehicle exhaust emissions while causing a summer-grade fuel used in winter to degrade engine startability during cold-starts. In one example, the adjustment may include increasing the fuel injection amount when the fuel is a summer-grade fuel and the vehicle is operated during a winter season. In another example, the adjustment may include decreasing the fuel injection amount when the fuel is a winter-grade fuel and the vehicle is operated during a summer season. As elaborated with reference to FIG. 4, based on the estimate fuel age and/or seasonal grade, an appropriate fuel correction factor may be determined and the adjusted fuel injection amount may be calculated using the determined fuel correction factor. In this way, by adjusting the fuel injection amount based on whether a summer-grade fuel is injected into an engine during a winter vehicle operation or a winter-grade fuel is injected into an engine during a summer vehicle operation, seasonal differences in fuel grade may be better compensated for, improving vehicle emissions and startability.

It will be appreciated that in addition to the fuel injection amount, one or more other engine operating parameters may be adjusted using the correction factor, such as engine boost, valve timing, throttle adjustments, etc. Alternatively, the one or more engine operating parameters may be adjusted based on the adjusted fuel injection amount.

In addition to adjusting a fuel injection amount, at 324, the routine may adjust engine operation relative to motor operation, to propel the vehicle, based on the seasonal grade of the fuel relative to the season of vehicle operation. For example, the routine may include increasing engine operation relative to motor operation to propel the vehicle in response to one of a summer-grade fuel in the fuel tank during a winter season of vehicle operation and a winter-grade fuel in the fuel tank during a summer season of vehicle operation. That is, engine operation may be increased while motor operation is decreased when propelling the plug-in hybrid electric vehicle. Herein, by increasing engine operation and fuel usage in response to the presence of an older fuel (that is, a fuel of an incorrect seasonal grade), fuel degradation due to prolonged residence times in the fuel tank, can be decreased.

Additionally, a subsequent fuel tank refill event, wherein the fuel tank is refilled with the seasonal grade fuel mandated for the current time of vehicle operation, may be expedited.

While the above routine illustrates adjusting the fuel injection amount and usage in response to a summer or winter grade of the fuel, as inferred from the estimated fuel age, in an alternate embodiment, the estimated fuel age may be compared to a threshold. For example, during a first condition, when an estimated fuel age is higher than a threshold, the routine may include operating the engine while injecting a first, larger amount of fuel. In comparison, during a second condition, when the estimated fuel age is higher than the threshold, the routine may include operating the engine while injecting a second, smaller amount of fuel. Herein, during the first condition, the injected fuel may have a first seasonal grade while during the second condition, the injected fuel may have a second, different seasonal grade. In one example, during the first condition, the injected fuel has a summer grade and the vehicle is operated in winter. In another example, during the second condition, the injected fuel has a winter grade and the vehicle is operated in summer. The threshold relative which the estimated fuel age is assessed may be adjusted based on a season, or time, of vehicle operation. For example, the threshold may be increased during a summer season (or during a first set of months of the year) and decreased during a winter season (or during a second, different set of months of the year). By adjusting the threshold based on the current time/month of vehicle operation, seasonal fuel grade differences may be better compensated for. Additionally, since the plug-in hybrid vehicle is capable of being propelled using energy from at least one of engine operation and motor operation, the control system may further increase engine operation relative to motor operation to propel the vehicle in response to the estimated fuel age being higher than the threshold. Thus, when the fuel currently available in the tank does not correspond to the fuel currently sold (and mandated), the controller may increase engine operation and fuel usage to expedite emptying of the fuel tank so that the fuel tank may be refilled with fuel of the correct seasonal grade. Additionally, fuel degradation due to prolonged residence in the fuel tank can also be reduced.

Now turning to FIG. 4, a schematic method 400 is shown for estimating the age and seasonal grade of fuel available in the fuel tank of a vehicle, such as a plug-in hybrid electric vehicle, wherein fuel usage may be lower due to frequent charging of an on-board energy storage device and higher usage of an electric motor to propel the vehicle. A controller (or control system) 402, may be configured with computer readable instructions and algorithms for estimating a fuel age and seasonal grade of fuel available in the vehicle's fuel tank. Based on the estimated fuel age and seasonal grade a fuel correction factor may be determined. As previously elaborated in FIG. 3, a fuel injection amount may be adjusted with the fuel correction factor if the seasonal grade of the available fuel does not match the seasonal grade mandated during the time of engine operation.

In one example, at 404, the fuel age and/or seasonal grade of the fuel is estimated based on a distance travelled since a last refilling of the fuel tank. The distance travelled may be determined by, for example, an odometer of the vehicle. The controller may monitor the distance traveled per day by the vehicle (e.g., an actual distance traveled per day by the vehicle, or an average distance traveled by the vehicle, as averaged over a predefined duration), and calculate the fuel age based on the distance traveled.

In another example, at 406, the fuel age and/or seasonal grade of the fuel is estimated based on an amount of fuel consumed since a last refilling of the fuel tank. The amount of fuel consumed may be determined by, for example, a fuel usage sensor of the vehicle. The controller may monitor the fuel consumed per day by the vehicle versus the distance traveled per day by the vehicle (e.g., actual distance or average distance), and calculate the fuel age based on the total fuel consumed versus the distance traveled.

In yet another example, at 408, the fuel age and/or seasonal grade of the fuel is estimated based on a fuel level output of a fuel level sensor coupled to the fuel tank. The controller may monitor the fuel level in the fuel tank when traveled per day by the vehicle versus the distance traveled per day by the vehicle (e.g., actual distance or average distance), and calculate the fuel age based on the fuel level versus the distance traveled.

In still another example, at 410, the seasonal grade of the fuel is estimated based on the output of a real-time clock included in the vehicle. For example, the vehicle may include a real-time clock configured to display a real-time clock time or clock setting (e.g., on a vehicle dashboard or message center visible to the vehicle operator). The clock time may be further interfaced with a calendar time of the clock. Based on the output of the real-time clock, information regarding the current date or season of vehicle operation may be determined. For example, the controller may monitor a clock time and date at which the fuel tank was last refilled to determine the age of the fuel.

As a further example, the vehicle may include an auxiliary system, and the fuel age and/or seasonal grade of the fuel is estimated based on a clock setting of the auxiliary system. The auxiliary system may include, for example, a navigation system (e.g., GPS), entertainment system (e.g., radio, stereo system, etc.), communication system (e.g., phone system), or other smart systems. The auxiliary system may have a clock setting and/or a calendar setting. Based on the clock setting and/or calendar setting of the vehicle auxiliary system, a current date or season of vehicle operation may be determined. For example, the controller may monitor a time (on the clock setting) and date (on the calendar setting) at which the fuel tank was last refilled to determine the age of the fuel.

Still other methods may be used to determine the fuel age. Additionally, any combination of the above methods may be used to estimate the fuel age. Based on the estimated fuel age, a seasonal grade of the fuel may be inferred. For example, if the fuel tank was refilled during a summer month (e.g., between June and September), the controller may infer that a summer-grade fuel is in the tank. A fuel correction factor may be calculated by the controller based on the estimated fuel age and seasonal grade relative to the season/time of vehicle operation. As such, the correction factor may only be required if the seasonal grade of the available fuel does not match the season of vehicle operation. For example, if the fuel is a summer-grade fuel and the vehicle is being operated in winter, when a winter-grade fuel is mandated, a first fuel correction factor may be determined. As another example, if the fuel is a winter-grade fuel and the vehicle is being operated in summer, when a summer-grade fuel is mandated, a second, different fuel correction factor may be determined. By varying the fuel correction factor based on the seasonal grade of the fuel relative to the current time of engine operation, differences in seasonal grade fuels may be compensated for.

In still further examples, as shown at 414, such as when the fuel in the fuel tank comes from an unknown or dubious source, the effective seasonal grade of the fuel, and a corresponding effective seasonal grade fuel correction factor, may be estimated based on the measured efficiency of cold-start combustion of the fuel. The measured efficiency of cold-start combustion may be determined based on an estimated engine torque and/or speed during a run-up in engine speed from cranking operation. For example, the expected engine speed run-up profile (e.g., expected speed for a given combustion event number from a first combustion event of the start from rest) can be compared with actual speed measurements, and a difference therebetween may provide an indication of the effective seasonal grade of the fuel.

In this way, by adjusting an engine fuel injection amount based on the age of the fuel and the seasonal grade of the fuel relative to a seasonal fuel mandated at the current time (and location) of vehicle operation, a winter-grade fuel may be used during summer seasons without degrading exhaust emissions. At the same time, a summer-grade fuel may used during winter seasons without degrading engine startability during engine cold starts. Overall, vehicle performance and emissions may be improved even when the seasonal grade of the fuel being used does not correspond to the mandated seasonal grade.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle including an engine, a motor, and a control system, comprising:
via the control system: determining a seasonal grade of fuel in a fuel tank of the vehicle relative to a current season of vehicle operation, and
adjusting an engine fuel injection amount based on the determined seasonal grade of fuel in the fuel tank.

2. The method of claim 1, wherein the vehicle includes a real time clock, and determining the seasonal grade of the fuel is based on an output of the real time clock, the seasonal grade of fuel including a summer grade and a winter grade and the vehicle being a plug-in hybrid vehicle.

3. The method of claim 1, wherein the vehicle includes an auxiliary system, and determining the seasonal grade of the fuel based on a clock setting of the auxiliary system.

4. The method of claim 1, wherein determining the seasonal grade of the fuel is based on one or more of a distance travelled since a last refilling of the fuel tank and an amount of fuel consumed since a last refilling of the fuel tank.

5. The method of claim 1, wherein the fuel tank includes a fuel level sensor, and wherein determining the seasonal grade of the fuel is based on a fuel level output of the fuel level sensor.

6. The method of claim 1, wherein determining the seasonal grade of the fuel is based on an efficiency of cold-start combustion of the fuel, wherein the efficiency of cold-start combustion is inferred from one or more of an engine speed and engine torque.

7. The method of claim 1, wherein the adjustment includes,
increasing the fuel injection amount when the fuel is determined to be a summer-grade fuel and the vehicle is operated during a winter season; and
decreasing the fuel injection amount when the fuel is determined to be a winter-grade fuel and the vehicle is operated during a summer season.

8. The method of claim 1, further comprising adjusting engine operation relative to motor operation to propel the vehicle based on the determined seasonal grade of the fuel relative to the current season of vehicle operation.

9. The method of claim 8, wherein the adjustment includes increasing engine operation relative to motor operation to propel the vehicle in response to determining one of a summer-grade fuel in the fuel tank during a winter season of vehicle operation and a winter-grade fuel in the fuel tank during a summer season of vehicle operation.

10. The method of claim 1, wherein the seasonal grade of fuel is determined based on a Reid vapor pressure of the fuel.

11. A method of operating a vehicle including an engine, a motor, and a control system, comprising:
via the control system: during a first condition, when the control system determines that an estimated fuel age is higher than a threshold, operating the engine while injecting a first, larger amount of fuel;
during a second condition, when the control system determines that the estimated fuel age is higher than the threshold, operating the engine while injecting a second, smaller amount of fuel;
wherein the threshold is adjusted based on a determined season of vehicle operation, and the threshold is increased during a determined summer season and decreased during a determined winter season.

12. The method of claim 11, wherein during the first condition, the injected fuel has a first seasonal grade and wherein during the second condition, the injected fuel has a second, different seasonal grade, the control system being configured to determine a seasonal grade of fuel.

13. The method of claim 11, wherein during the first condition, the injected fuel has a summer grade and the vehicle is operated in winter, and wherein during the second condition, the injected fuel has a winter grade and the vehicle is operated in summer, the control system being configured to determine a seasonal grade of fuel.

14. The method of claim 12, further including determining the fuel age based on one or more of a fuel level in a fuel tank coupled to the engine, a distance traveled since a most recent fuel tank refill event, an amount of fuel consumed since the most recent fuel tank refill event, a clock time, season information from an auxiliary system of the vehicle, and a measured efficiency of cold-start combustion.

15. The method of claim 11, wherein the vehicle is propelled using energy from at least one of engine operation and motor operation, the method further comprising increasing engine operation relative to motor operation to propel the vehicle in response to the determined fuel age being higher than the threshold.

16. A vehicle system, comprising:
an engine;
an electric motor;
a fuel tank including a fuel level sensor for providing fuel to the engine;
an auxiliary system including a clock;
a control system with computer readable instructions for:
inferring a seasonal grade of fuel based on an estimated age of the fuel; and
adjusting an engine fuel injection amount based on the seasonal grade of the fuel relative to a current season of vehicle operation.

17. The system of claim 16, wherein the control system includes code for estimating the age of the fuel based on one or more of an output of the fuel level sensor, a real-time clock time estimated by the clock of the auxiliary system, a distance traveled since a last fuel tank refilling event based on an output of an odometer, and an amount of fuel consumed since a last fuel tank refilling event based on an output of a fuel usage sensor.

18. The system of claim 17, wherein the control system includes code for estimating the season of vehicle operation based on the real-time clock time estimated by the clock of the auxiliary system.

19. The system of claim 16, wherein the adjusting includes,
increasing the fuel injection amount when a summer-grade fuel is injected during a winter vehicle operation; and
decreasing the fuel injection amount when a winter-grade fuel is injected during a summer vehicle operation.

20. The vehicle system of claim 16, further comprising increasing engine operation and decreasing electric motor operation in response to the estimated age of the fuel being higher than a threshold.

\* \* \* \* \*